Dec. 26, 1950   J. F. JELINEK   2,535,211
FISH LURE
Filed April 15, 1949
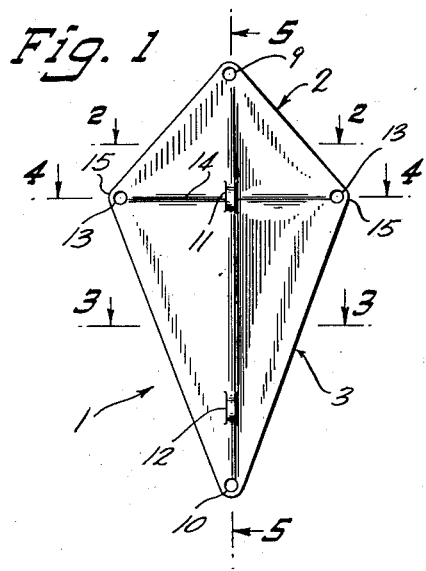
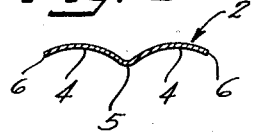
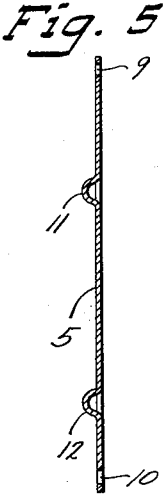
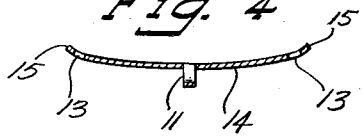
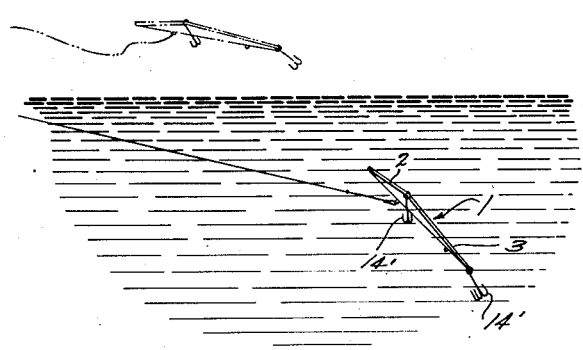
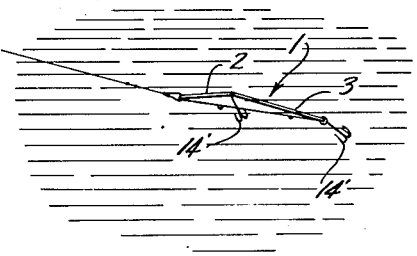
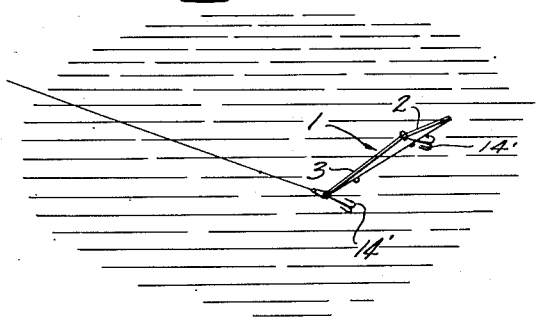
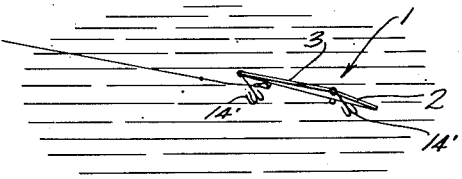
INVENTOR.
James F. Jelinek
BY
Arthur R. Woodford
Attorney Patented Dec. 26, 1950

2,535,211

UNITED STATES PATENT OFFICE 2,535,211

FISH LURE

James F. Jelinek, Milwaukee, Wis.

Application April 15, 1949, Serial No. 87,607

3 Claims. (Cl. 43—42.5)

This invention relates to a fish lure.

Objects of this invention are to provide a novel form of fish lure which is reversible, that is to say, so that either end can be used as a leading end of the fish lure, and which is so made that the line may be attached at either end, as stated, and at a plurality of intermediate points to thereby obtain different actions of the fish lure while it is being drawn through the water.

Further objects are to provide a fish lure which may be composed of metal or other similar material and which surfaces at ordinary reeling speeds and can be made to jump clear of the water, if desired, when the line is attached at a certain point on the fish lure.

Further objects are to provide a fish lure which has many different patterns of motion or, in other words, modes of acting while it is being drawn through the water at ordinary reeling speeds, and which can be made to provide a side wobble or sidewise bodily swing, and which may be arranged to provide a pronounced tail sweep of any desired extent by selecting the particular point of attachment of the line to the fish lure.

Further objects are to provide a fish lure which is so made that by varying the point of attachment of the line to the fish lure, the fish lure may be, as stated, caused to rise and surface and to jump clear of the water, if desired, or can be made to travel in a substantially horizontal path, or can be made to dive and thereafter rise as the line is reeled in to shorter and shorter lengths, and which is arranged for an extremely erratic motion when the line is attached at another predetermined, selected point.

Further objects are to provide a fish lure which may be readily stamped from metal or similar material, which is of rugged construction and may be very cheaply produced and which is substantially indestructible.

An embodiment of the invention is shown in the accompanying drawings, in which:

Figure 1 is a face view of the lure looking from the under side thereof with the hooks detached.

Figures 2, 3, 4, and 5 are line sectional views taken, respectively, on the lines 2—2, 3—3, 4—4, and 5—5 of Figure 1.

Figure 6 is a view showing in full lines the manner in which the lure rises in the water at ordinary reeling speeds and showing in imaginary lines the lure as it jumps clear of the water when the speed of travel of the lure is increased, such view showing the line attached at a predetermined point on the lure.

Figure 7 is a view showing the lure as it travels in a substantially horizontal path when the line is attached at another selected point on the lure.

Figure 8 shows the lure in a diving position and illustrates the action thereof when the line is attached at the normally rear end of the lure.

Figure 9 is a view showing the action of the lure when the line is attached at a still different selected point on the lure and shows the lure traveling in approximately a horizontal path.

Referring to the drawings, it will be seen that the fish lure comprises a roughly diamond-shaped portion indicated by the reference character 1 with the normally forward portion thereof relatively shorter and indicated by the reference character 2 and with the normally rear portion indicated by the reference character 3 relatively longer. This body portion has the upper section 2 dished rearwardly as shown most clearly in the sectional view of Figure 2. It is to be noted that the indented or dished portion 4 of the part 2 is pressed rearwardly beyond the central ridge 5 and slightly beyond the marginal edges 6, the reference characters referred to being shown primarily in Figure 2. It will be seen also that the normally rear and longer portion of the lure is also dished somewhat as shown in Figure 2, but to a lesser extent. The side wings of the rear portion are dished or depressed as indicated at 7 beyond the central ridge or rib 5 and slightly beyond the marginal edges 8, as shown in Figure 3.

The lure is provided with a front opening 9 and a normally rear opening 10 and with intermediate eyelets 11, and 12 providing thereby intermediate openings between the normally forward opening 9 and the normally rear opening 10. It is to be noted that the fish lure is also provided with side openings 13, 13. The openings 13, 13 and 10 receive fish hooks 14'.

It is to be noted from the section 4—4 that there is substantially a transverse ribbed portion 14 extending from opposite corners of the fish lure and that this rib is slightly curved or arched and is more sharply curved or arched at the corner portions 15.

In using the fish lure, if the line is attached through the opening provided by the eyelet 11, the fish lure will surface at ordinary reeling speeds and if the speed is increased, it will jump clear of the water as shown in imaginary lines in Figure 6. When the line is attached at the point indicated at Figure 6, the fish lure has a slight bodily wobble and a slight tail sweep.

When the line is attached at the normally forward end, namely at the opening 9 of the fish lure as shown in Figure 7, the fish lure follows a substantially horizontal path but has much more bodily wobble or side sweep and much more tail sweep than when the line is attached as shown in Figure 6.

When the line is attached to the normally rear portion of the fish lure, namely through the opening 10, see Figure 1, and as shown in Figure 8, the fish lure dives at ordinary reeling speeds and has very violent bodily wobble or sweep and a considerable tail sweep. The diving of the lure continues until the line gets shorter and shorter to such a point that the pull of the line upwardly will provide a large vertical component of force which tends to raise the fish lure bodily.

When the fish lure is attached through the opening provided by the intermediate eyelet 12, see Figure 1 and as shown in Figure 9, the fish lure will travel in an approximately horizontal path but will have an extremely erratic and unpredictable motion.

It is to be noted that it is not necessary to change or remove any of the fish hooks for any one of the several different points of attachment of the line. If it is desired, the line, at the point of attachment shown in Figure 8, may be passed through the same opening 10 as the hook or may be passed through the eye of the hook itself.

It will be seen that a novel form of fish lure has been provided in which curved, oppositely slanting, relatively shorter wings are provided for what may be called the normally forward portion of the fish lure, and longer, curved, oppositely slanting wings are provided for what may be called the normally rear portion of the lure.

It will be seen also that a transverse, dished or curved rib is provided which divides the shorter curved or dished wings from the longer curved or dished wings, and also it will be seen that a substantially straight longitudinally extending central rib has been provided.

These several curved surfaces coact to produce the many different motions when the fish lure is drawn through the water and when the line is attached to the different points of attachment or means of attachment of the fish lure.

It will be seen further that the fish lure is a very simple type of device and may be made very cheaply and easily.

Also it is to be noted that the fish lure is easily handled and easily manipulated and that any one of a plurality of different patterns of motion may be obtained by selecting the particular point of attachment of the line to the fish lure.

Although it is preferable to attach the line to the fish lure as shown and described, it is within the scope of this invention to attach the line to the lure in other ways, for instance to form a loop from opposite ends of the lure and attach the line at any desired point along this loop.

Although this invention has been described in considerable detail, it is to be understood that such description is intended as illustrative rather than limiting, as the invention may be variously embodied and is to be interpreted as claimed.

I claim:

1. A reversible fish lure comprising a diamond-shaped body, a plurality of hooks attached to adjacent corners of said body, said body having means for receiving a line, said body having a slightly bowed transverse rib and a substantially straight longitudinal rib, said transverse and longitudinal ribs dividing said body into a first pair of wings and a second pair of wings of triangular contour, said first pair of wings being longitudinally shorter than said second pair of wings and being dished and oppositely slanting and said second pair of wings being dished and oppositely slanting.

2. A fish lure comprising a diamond-shaped body and a plurality of hooks attached thereto, said body having a slightly bowed transverse rib nearer the front end than the rear end of said lure and having a substantially straight longitudinal rib and having means for receiving a line, said ribs dividing said body portion into a pair of triangular front wings and a pair of longer triangular rear wings, said wings being rearwardly slanting and being concave forwardly.

3. A fish lure comprising a diamond-shaped body and a plurality of hooks attached thereto, said body having a slightly bowed transverse rib nearer the front end than the rear end of said lure and having a substantially straight longitudinal rib and having means for receiving a line, said ribs dividing said body portion into a pair of triangular front wings and a pair of longer triangular rear wing, each of said wings being rearwardly slanting and being concave forwardly with the marginal edges of said wings located slightly forwardly of the deepest part of the concave portions of said wings.

JAMES F. JELINEK.

REFERENCES CITED

The following references are of record in the file of this patent:

UNITED STATES PATENTS

| Number | Name | Date |
|---|---|---|
| 1,306,719 | Robertson | June 17, 1919 |
| 1,585,943 | Streich | May 25, 1926 |
| 1,898,200 | Medlin | Feb. 21, 1933 |
| 2,238,604 | Sabin | Apr. 15, 1941 |
| 2,264,211 | La Chance | Nov. 25, 1941 |